US007096475B2

(12) United States Patent
Leyfer et al.

(10) Patent No.: US 7,096,475 B2
(45) Date of Patent: Aug. 22, 2006

(54) RUNLETS AS APPLICATION EXECUTION UNITS

(75) Inventors: Alex Leyfer, Palo Alto, CA (US); Alexander Balva, San Bruno, CA (US); Andrew Leman, San Rafael, CA (US); Sergey Finkelsteyn, Sunnyvale, CA (US); Elena Dolgopiatova, San Rafael, CA (US)

(73) Assignee: Exigen Group, San Francisco, CA (US)

( * ) Notice: Subject to any disclaimer, the term of this patent is extended or adjusted under 35 U.S.C. 154(b) by 677 days.

(21) Appl. No.: 10/238,344

(22) Filed: Sep. 10, 2002

(65) Prior Publication Data

US 2003/0172107 A1 Sep. 11, 2003

Related U.S. Application Data

(63) Continuation of application No. 60/362,557, filed on Mar. 5, 2002.

(51) Int. Cl.
*G06F 9/44* (2006.01)
(52) U.S. Cl. .................. 719/332; 717/162; 717/165
(58) Field of Classification Search ................ 709/203; 719/332, 331; 717/162–167
See application file for complete search history.

(56) References Cited

U.S. PATENT DOCUMENTS

| 5,515,536 A | 5/1996 | Corbett et al. |
| 6,182,109 B1 | 1/2001 | Sharma et al. |

FOREIGN PATENT DOCUMENTS

WO PCT/US 03/06881 4/2003

*Primary Examiner*—William Thomson
*Assistant Examiner*—George L. Opie
(74) *Attorney, Agent, or Firm*—Greenberg Traurig, LLP; John P. Ward

(57) ABSTRACT

An execution unit comprising a runlet and execution environments and methods for using runlets. According to one aspect, abstract parameters comprising function arguments defined for child runlet functions may be bound to corresponding real variables in a parent runlet. As a result, when a function corresponding to a child runlet gets invoked, it uses the current values of the parent runlet variables as the function arguments. According to another aspect, each runlet execute in an execution context comprising an instance of variables and parameters declared by that runlet. A context manager, typically implemented by an application server, may be used to manage execution of the runlets so as to prevent anomalies, such as race conditions. According to another aspect, abstract parameters for a runlet may be bound to corresponding application parameters for an application.

12 Claims, 10 Drawing Sheets

RUNLETS AS APPLICATION EXECUTION UNITS

CLAIM OF PRIORITY

This application is related to, and hereby claims the benefit of provisional application No. 60/362,557 which was filed Mar. 5, 2002 (PTO p/c lists Mar. 5, 2002).

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright ©2002,Exigen Group, All Rights Reserved.

FIELD

The invention generally concerns to software architecture and execution environments. More particularly, the invention concerns a novel executable unit and corresponding execution environment in which the executable unit may be implemented.

BACKGROUND

In today's object-oriented enterprise software, a standard programming model is used for development of enterprise applications. FIG. 1A shows such a model 100, comprising three main blocks, including a presentation layer 103, a computation layer 101, and a database 102. In some cases, the presentation layer and the computation layer are combined into an execution model (EM) block 120, as shown in FIG. 1B. Execution model block 120 comprises the presentation layer and the computation layer. Often, additional blocks may be inserted, such as a business object model 122, which is responsible for the business processes that are executed in an enterprise system. Execution model block 120 comprises the presentation layer and the computation layer. Often, additional blocks may be inserted inserted, such as a business object model 122, which is responsible for the business process are that executed in an enterprise system.

The manner in which the combination of the process layer, the presentation layer, and the computation layer are configured allows for structuring of internal modules (layers). Typically, these modules represent function calls, so a module is called as a function with an argument. These arguments may have local and/or global parameters, and the programmer must pay careful attention to which type of argument is invoked. Once the number of local and global parameters exceeds a dozen or so, they tend to become difficult to manage. As a result, the number of programming mistakes may rise dramatically, increasing project cost and timing in unpredictable ways.

Accordingly, what is clearly needed is a new method for modularizing such blocks that offers the flexibility of abstract mapping of parameters, so that the number of parameters remain manageable.

SUMMARY

In accordance with aspects of the present invention, an execution unit comprising a runlet and execution environments and methods for using runlets are disclosed. According to one aspect, abstract parameters comprising function arguments defined for child runlet functions may be bound to corresponding real variables in a parent runlet. As a result, when a function corresponding to a child runlet gets invoked, it uses the current values of the parent runlet variables as the function arguments. According to another aspect, each runlet execute in an execution context comprising an instance of variables and parameters declared by that runlet. A context manager, typically implemented by an application server, may be used to manage execution of the runlets so as to prevent anomalies, such as race conditions via context switching operations. According to another aspect, abstract parameters for a runlet may be bound to corresponding application parameters for an application.

Other features and advantages of the present invention will be apparent from the accompanying drawings, and from the detailed description, that follows below.

BRIEF DESCRIPTION OF THE DRAWINGS

Embodiments of the present invention are illustrated by way of example, and not limitation, by the figures of the accompanying drawings in which like references indicate similar elements and in which:

FIG. 6 is a schematic diagram illustrating management of runlet contexts to prevent race conditions and the like;

DETAILED DESCRIPTION

In the following detailed description of exemplary embodiments of the present invention, numerous specific details are set forth in order to provide a thorough understanding of the described embodiments of the present invention. However, it will be apparent to one skilled in the art that alternative embodiments of the present invention may be practiced without these specific details. In some instances, well-known structures and devices are shown in block diagram form, rather than in detail, in order to avoid obscuring the description of exemplary embodiments of the present invention.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Runlets

Figure 1A:
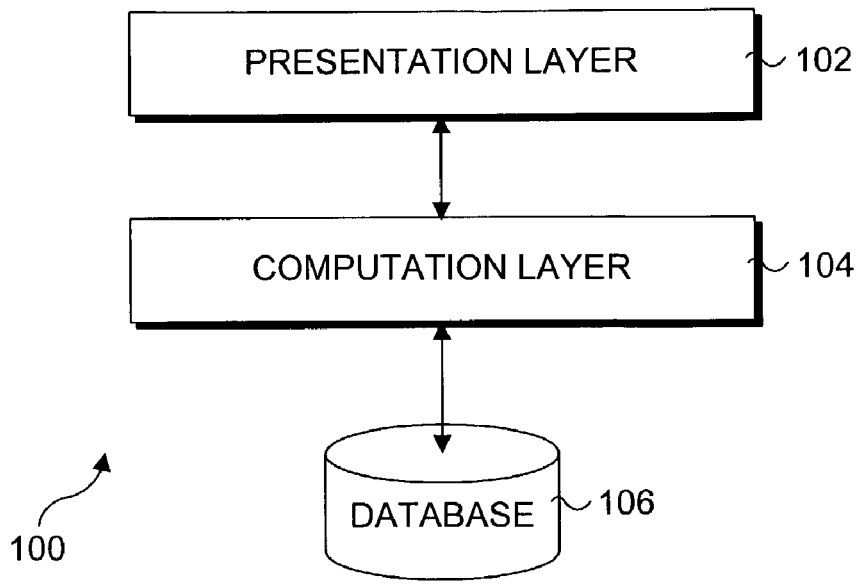
FIG. 1A shows a conventional execution environment, including a presentation layer, computation layer, and database.
Figure 1B:
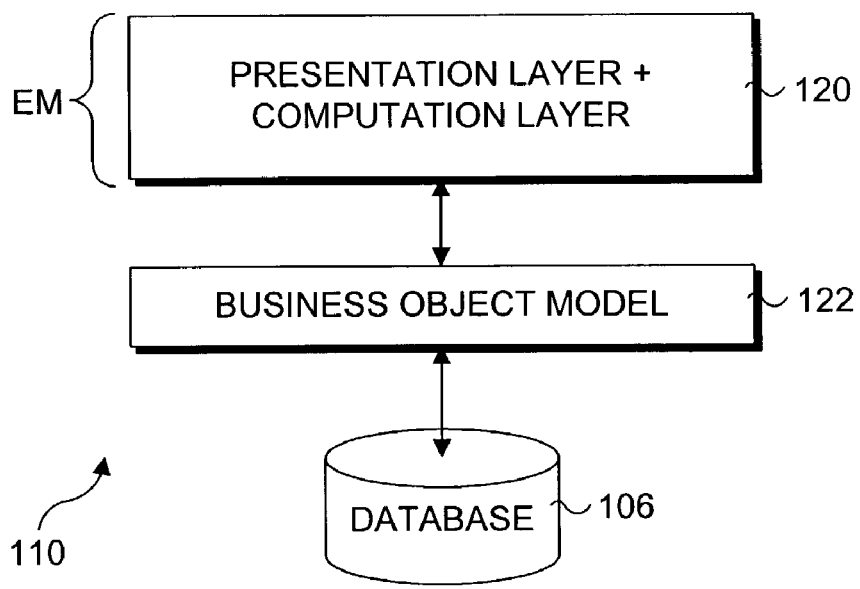
FIG. 1B shows a variation of the execution environment of FIG. 1A, wherein the presentation layer and computation layer are combined into an execution model layer.
Figure 2:
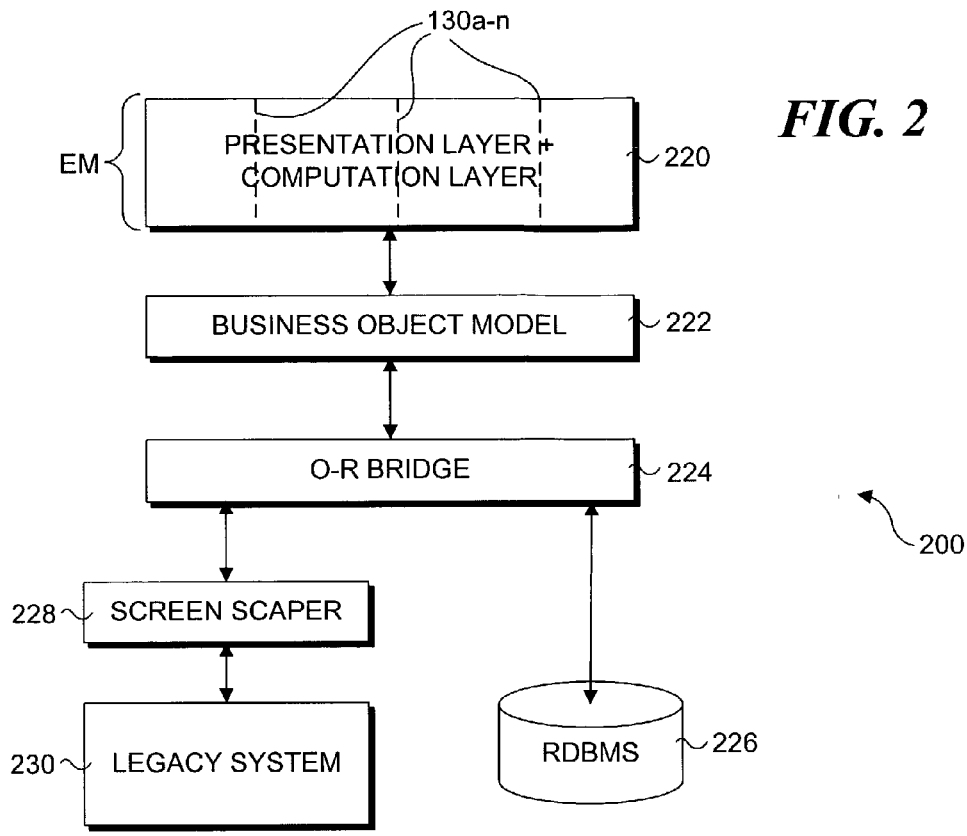
FIG. 2 shows an enterprise development model in accordance with one embodiment of the invention.

FIG. 2 shows an enterprise application development model 200 in accordance with one embodiment of the invention. In the model, the presentation and computation layers are combined in an execution model 220 in a manner similar to execution model 120. However, as indicated by lines 221a–n, these layers may be split into a plurality of modules. Furthermore, some modules may not occupy the full width the execution model, but rather only a partial width, as illustrated.

In addition to a business object model 222, there is also an object-to-relational (O-R) bridge 123, such as GemStone, Versant, ObjectRelationalBridge, DbGen, GLORP, Forte (formerly Java Blend), TopLink, JdbcStore, ObjectFrontier, PragmaTier; as well as various JDX and JDO vendors, such as Software Tree and Object Industries (JRelay), etc. In general, O-R bridge 123 performs object to relational data mapping, which includes the generation of SQL (structured query language) statements to provide access to a SQL relational database management system (RDBMS) 124. In some instances, the model may further include legacy integration tools, such as screen scraper 125 (e.g., Exigen Integration System (EIS)) to support connection to a legacy system 126.

Figure 3:
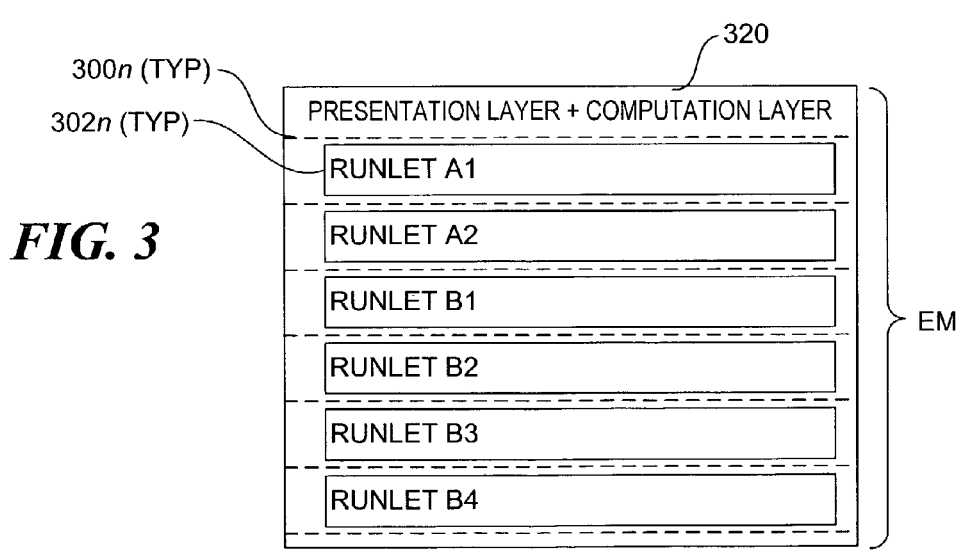
FIG. 3 shows an execution model layer that includes a plurality of runlets, which comprise an execution unit in accordance with embodiments of the invention.

Another embodiment of the execution model (320) is shown in FIG. 3. In this embodiment, the portioning of the combined presentation and computation layers is horizontal, as indicated by lines 300a–n. In accordance with aspects of the present invention, an execution unit called a "runlet" 302a–n occupies each partition. Generally, a runlet is an isolated, self-contained atomic unit of functionality, which consists of context variables, scripts, and, optionally, definitions of user-interface (UI) elements, including placeholders for child runlets. Runlets are further designed to support encapsulation of runlet elements; as such, a runlet is also a unit of reusability.

Runlets are somewhat similar to object oriented language classes. Another concept that runlets share with other programming languages is the use of namespaces. Generally, runlets exhibit class-namespace dualism in their behavior, especially when it comes to engaging one runlet from within another, as discussed in further detail below.

Figure 4:
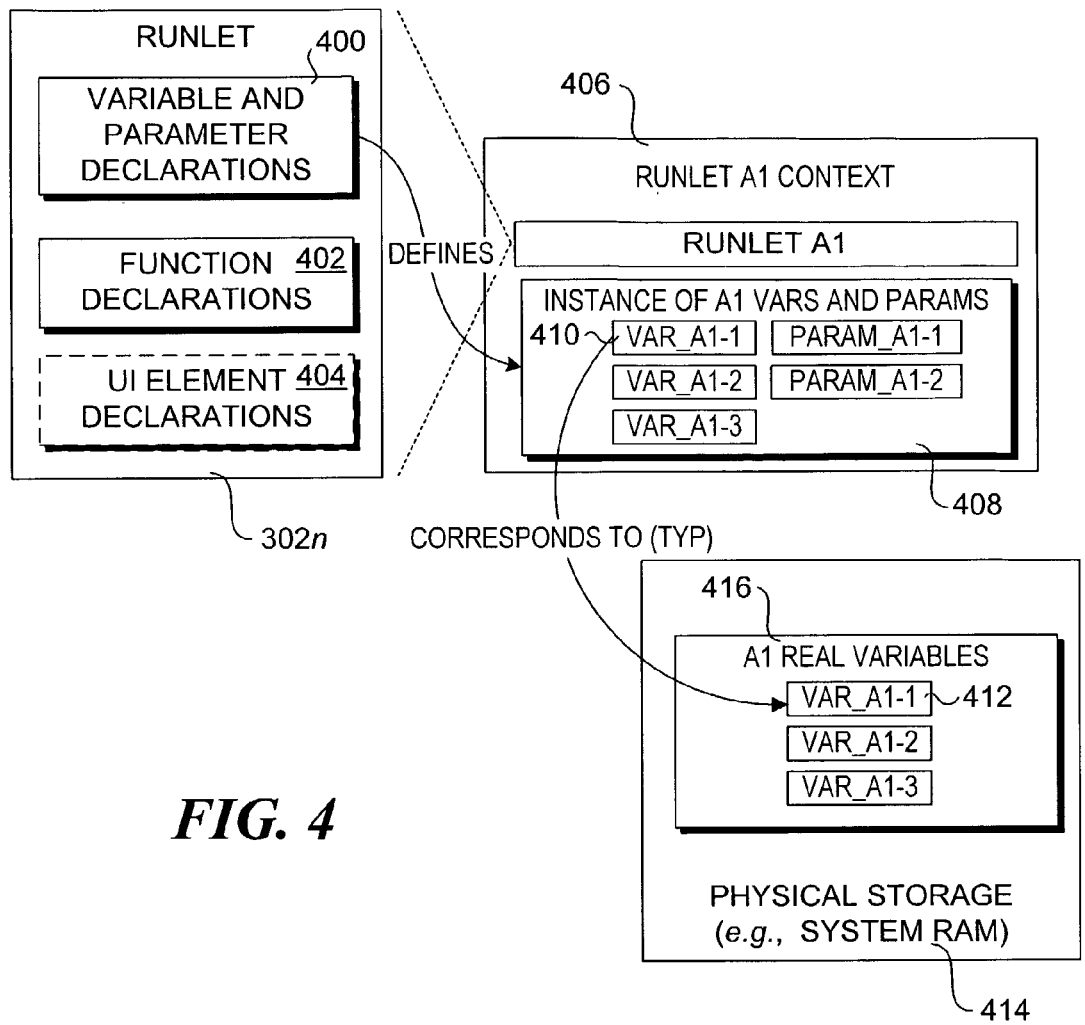
FIG. 4 is a schematic diagram illustrating various components of a runlet, and where runlet variables are stored.

As shown in FIG. 4, a runlet consists of variable and parameter declarations 400, functions 402, and, optionally, UI element declarations 404. The declaration of variables and parameters define the runlet's execution context 406, which at run-time comprises an instance of variables 408 defined by the variable declarations. For non-child runlets, each variable instance corresponds to a real variable stored in physical storage, such as system RAM. For example, a variable instance 410 corresponds to a real variable 412 stored in system RAM 414. Declaration of parameters also define runlet instance identification material and determines how an Application Server (that is used to host applications that employ runlets) is to perform context management for a given runlet.

In one embodiment, functions are routines defined in a scripting language, which are invoked by the Application Server and get executed in a runlet's context. There are two categories of functions: functions that are semantically meaningful to the Application Server, known as "handlers," and functions that have no particular meaning from the Application Server's point of view. In general, the Application Server invokes handlers to process certain events; functions that are not handlers get invoked from within handlers without explicit involvement on the part of the Application Server.

In some instances, runlets may be used for external presentation (i.e., for UI purposes. Accordingly, the presentation of runlets is defined in term of UI element declarations 404.

The architecture supports two functionalities that are provided during run-time by the Application Server to assist in application development: context switching and inter-context mapping. Context switching facilitates an automatic, transparent management of the context of a particular runlet. Inter-context mapping enables binding of distinct runlets into an application.

Context Switching

Typically, a developer will design a runlet with the assumption that the context of a runlet will not change unless specifically requested by a function of such a runlet. For example, the developer can assume that a runlet managing orders works with a single given order. In reality, however, the application should be able to work with more than one order and one order may transition to another.

Figure 5:
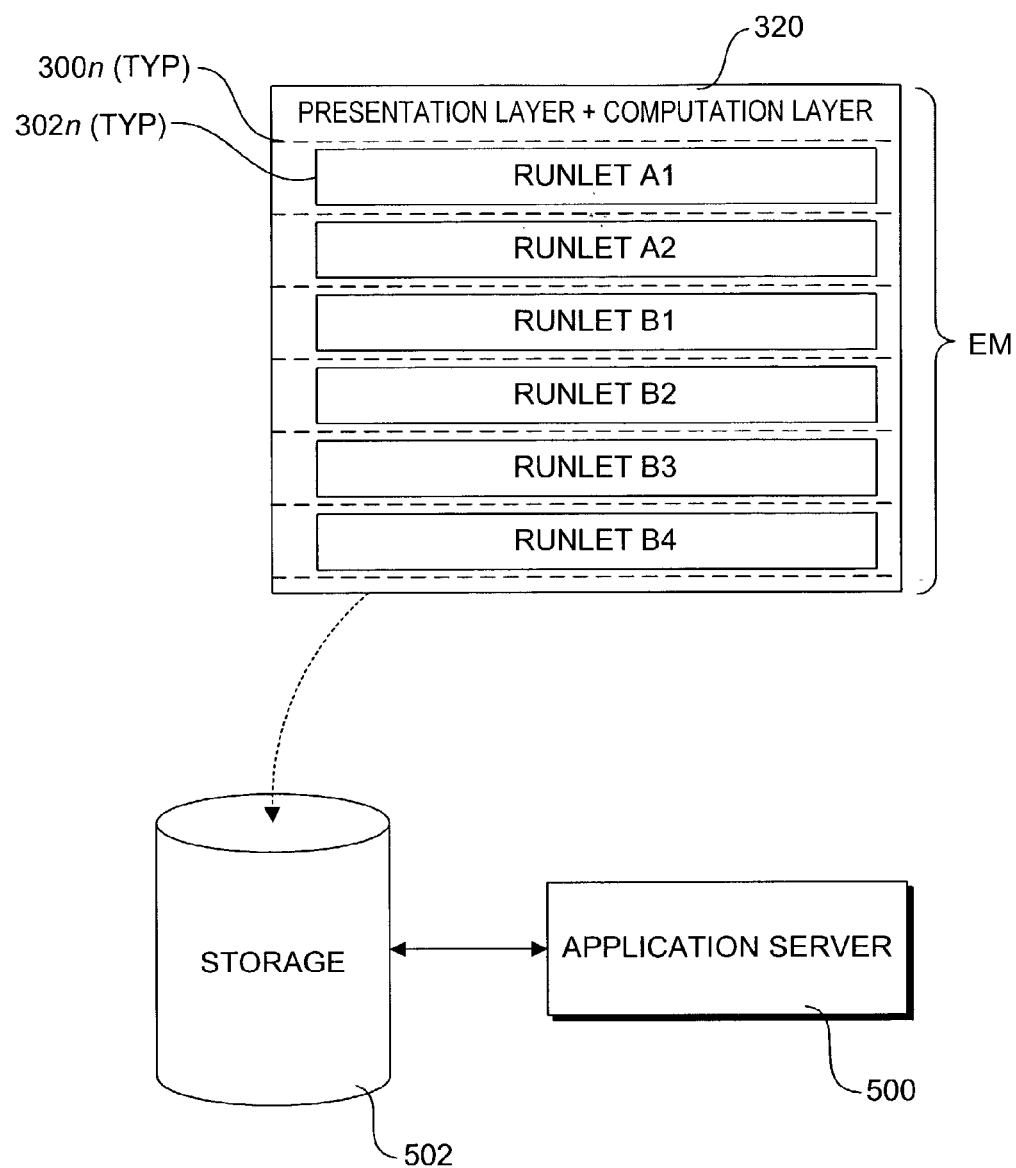
FIG. 5 is a schematic diagram illustrating an execution environment in which runlets may be executed.

An Application Server (AS), such as AS 500 in FIG. 5 serves as a host or manager for an execution model 320. AS 500 uses storage means 502 to store, among other things, runlets such as runlets 302n. In accordance with one aspect of the embodiment, the AS supports the application developer by managing the runlets' context in a way that ensures that a given runlet always runs in the context of a required order.

Figure 6:
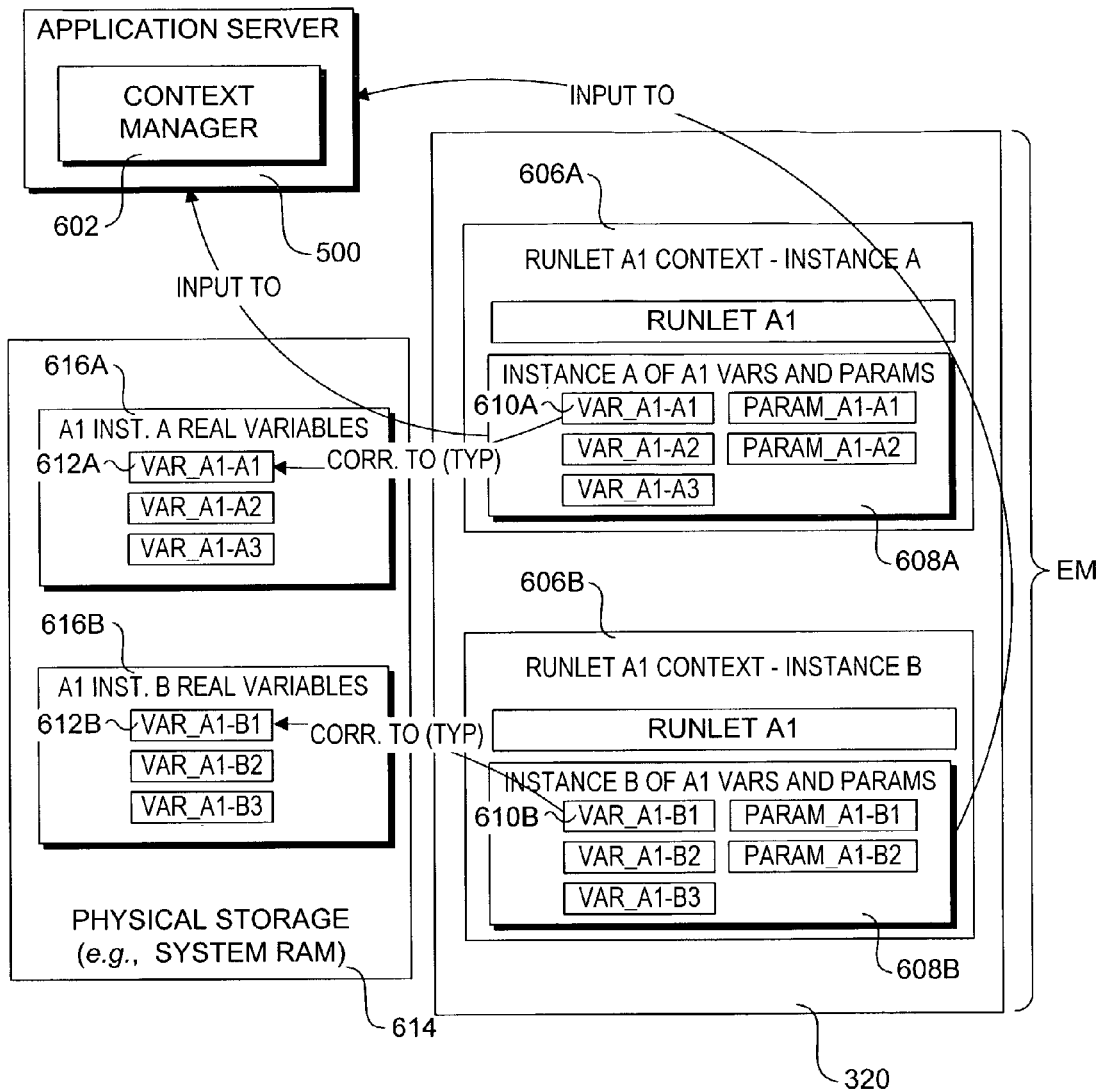

FIG. 6 shows an example of a situation in which two instances of a runlet A1 (A1-A and A1-B) co-exist, each with its own context 606a and 606b, respectively defined by runlet variable and parameter instances 608A and 608B. As depicted, each context includes a respective localized variable 610A and 610B corresponding to real variable instances 612A and 612B, respectively. Furthermore, in this example the instances of runlet A1 are to work cooperatively in a predetermined order to perform a given task, wherein the results (i.e., variables) of a first runlet instance are to be used subsequently by a second runlet instance. Accordingly, it is desired to prevent a "race-condition" between the two runlet instances. A race-condition is a situation wherein two functions start, the second slightly delayed after the first. The outcome of the second function depends on the results of the first. Without proper management, as provided by the runlet context herein, the second function may, however, finish before the first, consequently using garbage data, because the first did not finish yet and hence was unable to provide the required data on time.

As discussed above, the Application Server manages the context of the runlets; these operations are depicted by context manager 602. Part of this context management facility is enabled via runlet parameters, which may be used to facilitate such a required order between instances of the same runlet, or between different runlets. As a result, the Application Server will manage the separate runlets or runlet instances such that race conditions are not allowed to occur. The benefit of the proposed approach is that the developer does not need to develop a separate mechanism for managing execution orders to prevent race conditions and the like such management is already provided by the Application Server. Thus, an application developer has only to be concerned with creating the functionality to handle a single order and need not account for inter-order transitions, concurrency, race-conditions and sequencing, amongst other things. This behavior of the Application Server, wherein it automatically creates and manages multiple contexts for a given runlet to work with multiple instances of an object or objects, is known as context switching.

Additionally, besides fully automatic context switching, the Application Server supports in some cases a semi-automatic, hybrid approach. In the case of a hybrid approach, the AS enables the application developer to explicitly specify a runlet's parameter changing to cause automatic context switching separately from parameter changing to cause the execution of a custom context management handler (a manual type of context manager 602). For example, such a handler might comprise a script function created by an application developer and executed in a current runlet context.

Inter-Context Mapping

One of the novel aspects of using runlets is that rather than using global and local parameters, runlet may be configured such that their arguments (known as abstracts or abstract parameters) are bound to a parent namespace (when included). In this particular aspect of the approach, each abstract has a certain behavior, similar to the behavior of arguments in system modules. However, an important difference is that the abstracts maintain a constant binding to a runlet's parent's namespace, as opposed to the manner in which arguments are passed to modules and the like during conventional procedural calls. To support such a constant binding, variables corresponding to a parent runlet (logically stored in the parent's namespace) may be mapped to corresponding arguments (abstracts) in a child runlet, whereby the child runlet arguments are bound to the parent runlet variables. This constant binding differentiates runlets from regular modules, such as procedures or functions, wherein proactive passing is required (to invoke or re-invoke a function, etc.) when a function is called; in contrast, runlets do not need a re-invocation to remain involved.

The runlet's variables and functions are encapsulated within the runlet's context to facilitate the reusability of a runlet. That is, variables of a given runlet are by default not visible to any other runlet of the application. However, to support data exchange between runlets, such as between a parent and child runlet, there needs to be a mechanism for making such data (i.e., variables) assessable. This is provided by the foregoing mapping scheme. Since there is still a need to exchange data among runlets, there is a mechanism to pass the data from a parent runlet to a child runlet and back.

Abstract parameters may be defined for any runlet. When such a runlet is included (in the application) it becomes a child of either another runlet (its parent) or the application itself, based on the runlet hierarchy defined for the application. In conjunction, real variables of the parent runlet (or application) are mapped into the abstract parameters of the child runlet. Technically, since the mapped variables and abstract parameters refer to the same object (i.e., same piece of data stored in memory), the binding construct does not require any additional CPU cost.

In general, the developer of a child runlet does not need to posses any knowledge of the parent runlet. Under the binding construct, the child runlet does not reference the parent runlet, which enables reuse of child runlet. On the other hand, since the developer of parent runlet has to provide the mappings between parent variables and corresponding abstract parameters defined in a child runlet, the developer should understand the specification of the child runlet, but doesn't need not how the functions of the child runlet are implemented. Such a methodology enforces a top-down approach to application development.

There are two ways for a runlet to engage another runlet: binding and invocation. Binding is mechanism whereby the developer declaratively specifies their intend to use a runlet as a child runlet for a given runlet by placing one runlet under the other in the application's runlet hierarchy. This technique is similar to creating nested namespaces and is recommended in all cases where a child runlet is known during the application design time or when the selection of a particular child runlet depends on declaratively defined (i.e., not expressed in a script) application logic.

Figure 7:
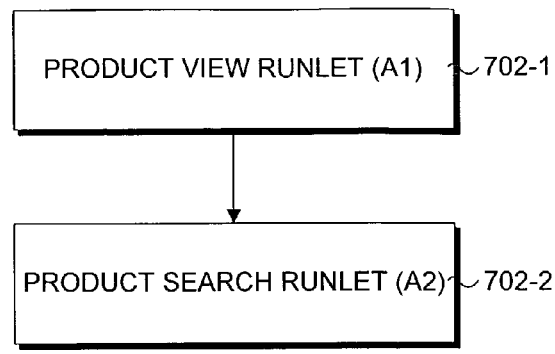
FIG. 7 shows a hierarchical diagram defining parent-child relationships between a parent runlet and a child runlet.

For instance, consider the parent child runlet relationship shown in FIG. 7. In this case, a product view runlet 702-1 is defined to be the parent of a product search runlet 702-1 in a portion of an application runlet hierarchy. In accordance with the binding scheme, the product search runlet will be bound to product view runlet during the design time and this child-parent binding will remain this way throughout execution of the application, regardless of a user's behavior.

Figure 8:
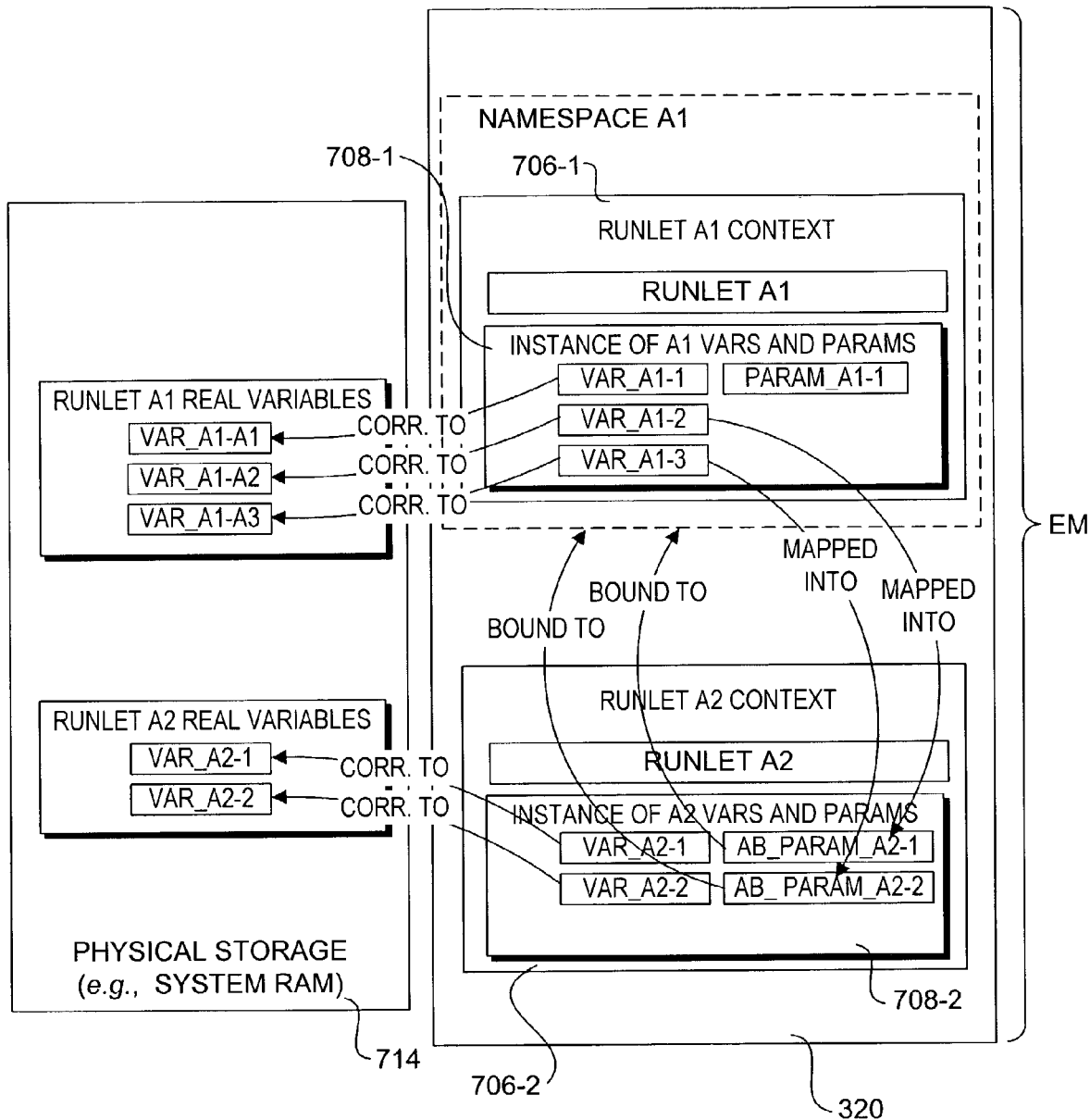
FIG. 8 is a schematic diagram illustrating how parent runlet variables are mapped into child runlet abstract parameters.

Such a binding and corresponding mapping of variables into abstract parameters are shown in FIG. 8. In this example, the product view runlet (A1) executes in a context 706-1 comprising an instance of variables and parameters 708-1. Similarly, the product search runlet (A2) executes in a context 706-2 comprising an instance of variables and parameters 708-2. As before, the variables of each runlet context correspond to real variables that will be stored in a physical storage means, such as system RAM 714. Additionally, all or a portion of the variables of the parent runlet will also be mapped into corresponding abstract parameters in the child runlet. For example, variables VAR_A1-2 and VAR_A1-3 are mapped into abstract parameters AB_PARAM_A2-1 and AB_PARAM_A2-2, respectively. Since this mapping is defined declaratively (i.e., at design time), the mapped abstract parameters of the child runlet (e.g., AB_PARAM_A2-1 and AB_PARAM_A2-2) are bound to the parent runlet's namespace (e.g., namespace 740).

In general, there are three types of mappings that may be performed: context variable export, context variable import, and context variable bi-directional mapping. Under context variable export mapping, a parent runlet may map selected variables into abstract parameters of child runlets in a manner such that the variables are read-write variables for the parent runlet and read-only variables for the child runlet. Under context variable import mapping, a parent runlet may map selected variables into abstract parameters of child runlets in a manner such that the variables are read-only variables of the parent runlet and read-write variables of the child runlet. Finally, under context variable bi-directional mapping, a parent runlet may map selected variables into abstract parameters of child runlets in a manner such that the variables are read-write variables for both the parent and the child runlets.

Figure 9:
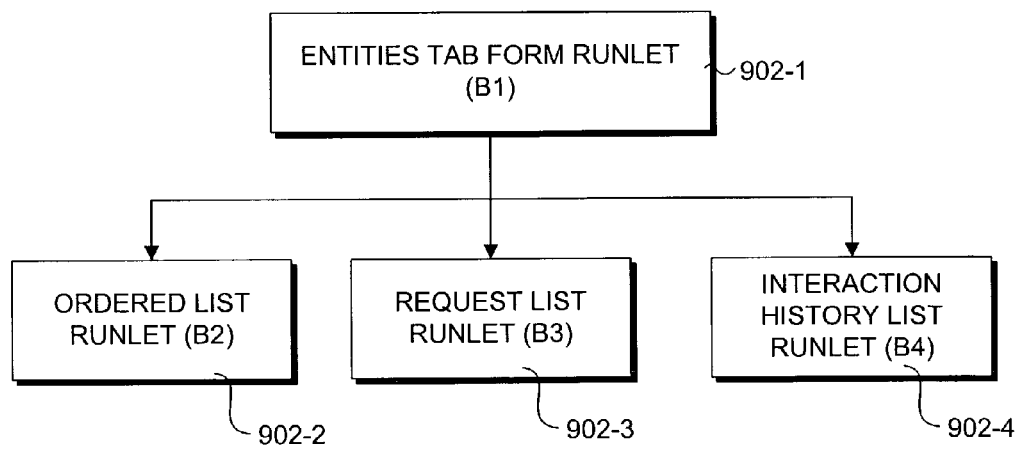
FIG. 9 shows a hierarchical diagram defining parent-child relationships between a parent runlet and three child runlets.
Figure 10:
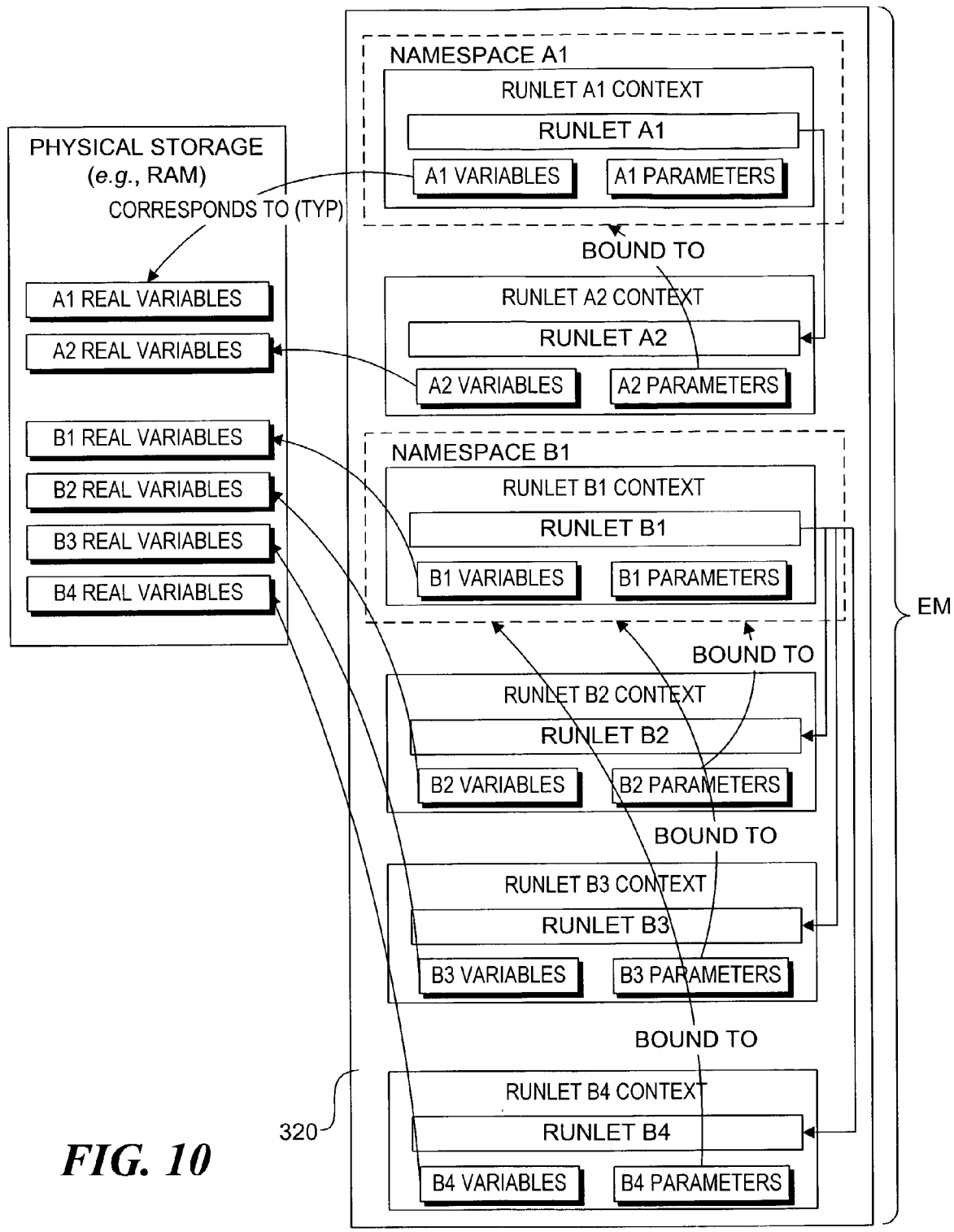
FIG. 10 is a schematic diagram illustrating abstract parameters of child runlets that are bound to corresponding parent runlet namespaces in accordance with examples of this disclosure.

Abstract parameters of runlets need not necessarily be mapped into the variables of a parent runlet. Abstract parameters can alternatively be mapped from an external source (a runlet or its context) into the application parameters, similar to how resource parameters may be specified in a URL. These mappings are similar to the parent-child runlet mappings described above. Accordingly, the application would replace the parent runlet in the drawings herein In another example shown in FIG. 9, an entities tab form runlet (B1) 902-1 is defined via the application runlet hierarchy to be a parent runlet of three child runlets, including an order list runlet (B2) 902-2, a request list runlet (B3) 902-3, and interaction history list runlet (B4) 902-4. During application execution, content corresponding to each of the child runlets B2, B3, and B4 may be displayed (one at a time) based on a currently-selected tab in the parent entities tab form runlet. As before, real variables in parent runlet B1 are mapped into corresponding abstract parameters in each of child runlets B2, B3, and B4 during design time. As, a result the abstract parameters of each of the child runlets B2, B3, and B4 will be bound to corresponding variables contained in the parent runlets namespace (B1), as shown in FIG. 10.

As discussed above, another way for a runlet to engage another runlet is invocation. Invocation is a mechanism via which the application developer programmatically invokes (i.e., calls) a runlet from within a function of another runlet. This technique is similar to calling a function and is used when the child runlet is not known during application design time or selection of a particular runlet depends on logic of the invoking function. For instance, a fraud verification form runlet might be invoked from an agent scripting runlet based on certain business logic defined for the agent scripting runlet.

Now, let's consider what happens at runtime. Generally, runlets expose functions that are invoked by the Application Server in response to internal and external run-time events. Such functions are known as handlers. In addition to standard handlers, that perform common tasks such as runlet instance initialization, the application developer can define custom handlers to facilitate the execution of business logic for a particular application. For instance, there might be a handler that gets invoked in response to selection of a request from a list of requests or pressing a "New Order" button on a screen.

With reference to FIG. 8, suppose that parent runlet A1 is invoked and is currently executing. Parent runlet A1 may include logic to invoke child runlet A1, or the invocation of the child runlet may be made by the Application Server. Upon being invoked, the function arguments for the child runlet, which comprise the values corresponding to abstract parameters AB_PARAM_A2-1 and AB_PARAM_A2-2, will comprise real variables VAR_A1-2 and VAR_A1-3, respectively. Since these are real variables, the value of the variables may change over time, and are thus unknown at design time. Furthermore, since the arguments (abstract variables) for the child runlets are bound to corresponding variables in the parent runlet's namespace, subsequent execution of the child runlet does not require arguments to be explicitly passed to the runlet's handlers. Thus, the child runlet can respond to parent runlet events without being re-invoked in the convention manner, such as is required of conventional functions and procedures.

Figure 11:
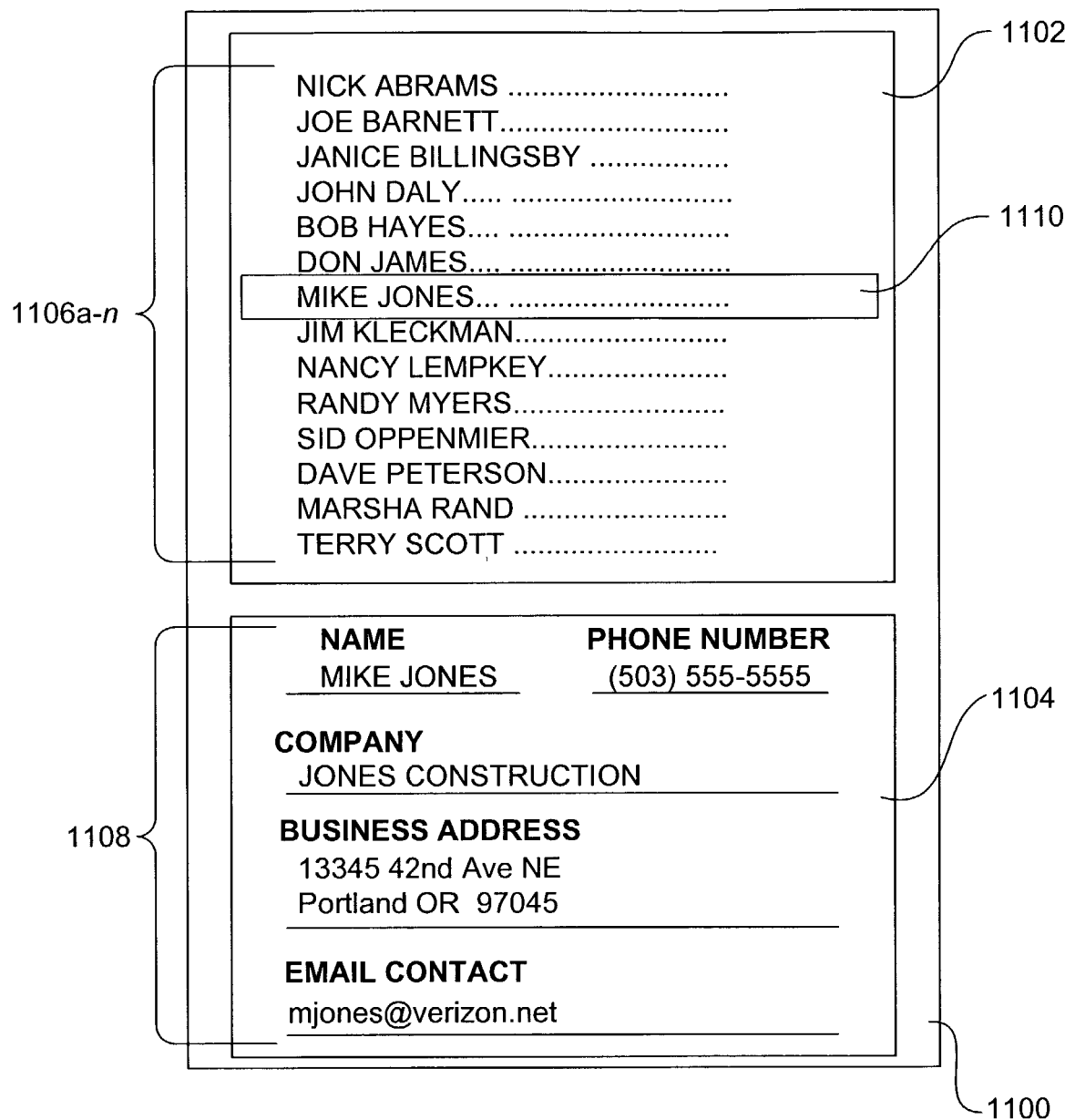
FIG. 11 is a representation of a application screen including a contact list window and a contact details windows.

FIG. 11 shows an example of how the novel method of this disclosure improves the programming process. In FIG. 11, a screen 1100 is divided into a contact list window 1102 and a contacts details window 1104. Various contacts 1106a–n are displayed in a list in contacts list window 1102, wherein specific details 1108 of a selected contact, as indicated by a selection bar 1110, are displayed in contact details window 1104. In a normal procedural environment, whenever the selection bar 1110 is moved by the user to another contact in the list, a function used to render contacts details window 1104 must be re-invoked by the application (via a function call with a new set of arguments) to redraw the window.

In contrast, a re-invocation of this type is not required under the novel art of this disclosure. For this example, a parent runlet would be used to support the operation of contact list window 1102 (or any user input via screen 1000), while a corresponding child runlet would be used to support the operation of contact details window 1104. In this instance, the parameters of the child runlet corresponding to the function used to render contacts details window 1104 would be bound to variables in the parent runlet's namespace. Thus, in response to a user-selection of a new contact, the parent namespace variables would change to reflect the new contact. These variable changes, which also include changes to the variables that are mapped to the child runlet's abstract parameters would then propagate through the system, whereby the Application Server would automatically re-invoke the child runlet without passing it any arguments. Accordingly, the contact details window would be refreshed without the programmer or the system having to invoke any specific new function (i.e., an existing function called with a new argument set).

Exemplary Server Computer System

Figure 12:
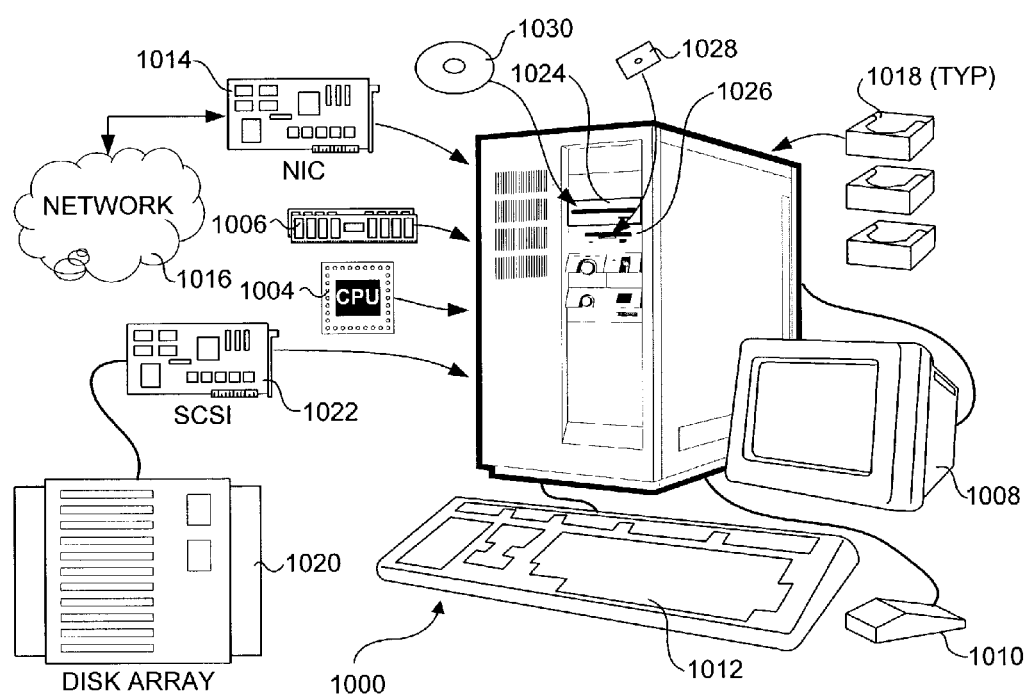
FIG. 12 is a schematic diagram of an exemplary computer server system that may be employed to practice the operations described in the embodiments of the invention disclosed herein.

With reference to FIG. 12, a generally conventional computer server 1000 is illustrated, which is suitable for use in connection with practicing operations of the embodiments of the present invention described above. Examples of computer systems that may be suitable for these purposes include stand-alone and enterprise-class servers operating UNIX-based and LINUX-based operating systems.

Computer server 1000 includes a chassis 1002 in which is mounted a motherboard (not shown) populated with appropriate integrated circuits, including one or more processors 1004 and memory (e.g., DIMMs or SIMMs) 1006, as is generally well known to those of ordinary skill in the art. A monitor 1008 is included for displaying graphics and text generated by software programs and program modules that are run by the computer server. A mouse 1010 (or other pointing device) may be connected to a serial port (or to a bus port or USB port) on the rear of chassis 1002, and signals from mouse 1010 are conveyed to the motherboard to control a cursor on the display and to select text, menu options, and graphic components displayed on monitor 1008 by software programs and modules executing on the computer. In addition, a keyboard 1012 is coupled to the motherboard for user entry of text and commands that affect the running of software programs executing on the computer. Computer server 1000 also includes a network interface card (NIC) 1014, or equivalent circuitry built into the motherboard to enable the server to send and receive data via a network 1016.

File system storage may be implemented via one or more hard disks 1018 that are stored internally within chassis 1002, and/or via a plurality of hard disks that are stored in an external disk array 1020 that may be accessed via a SCSI card 1022 or equivalent SCSI circuitry built into the motherboard. Optionally, disk array 1020 may be accessed using a Fibre Channel link using an appropriate Fibre Channel interface card (not shown) or built-in circuitry.

Computer server 1000 generally may include a compact disk-read only memory (CD-ROM) drive 1024 into which a CD-ROM disk may be inserted so that executable files and data on the disk can be read for transfer into memory 1006 and/or into storage on hard disk 1018. Similarly, a floppy drive 1026 may be provided for such purposes. Other mass memory storage devices such as an optical recorded medium or DVD drive may also be included. The instructions comprising the software program and/or modules that cause processor(s) 1004 to implement the operations of the present invention that have been discussed above will typically be distributed on floppy disks 1028 or CD-ROMs 230 (or other memory media) and stored in one or more hard disks 1018 until loaded into memory 1006 for execution by processor(s) 1004. Optionally, the instructions may be contained in a carrier wave file that is loaded via network 1016.

In the foregoing specification, the invention has been described with reference to specific exemplary embodiments thereof, It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for executing a function in a computing system, comprising:
    defining a function to be performed by a first executable unit comprising a child runlet, said function including at least one input argument;
    defining abstract parameters for the child runlet corresponding to said at least one input argument;
    defining, through declarative logic, a hierarchical relationship between the first runlet and a second runlet such that the second runlet comprises a parent runlet and the first runlet comprises the child runlet; and
    binding the abstract parameters of the child runlet to real variables of a second execution unit comprising the parent runlet such that the function will employ the real variables of the parent runlet as function arguments if invoked during a run-time operation, without the parent runlet proactively passing the real variables as function arguments to the function, wherein abstract parameters of the child runlet may be bound to real variables of the parent runlet by performing the operations of:
        declaring abstract parameters for a first runlet; and
        selecting variables in a namespace corresponding to a second runlet to be mapped into corresponding abstract parameters of the first runlet.

2. The method of claim 1, wherein the parent and child runlets comprise a portion of an application being served by an application server, and wherein the function may be automatically re-invoked by the application server without requiring corresponding logic to be defined in the application.

3. The method of claim 1, wherein the variables of the parent runlet are mapped into the abstract parameters of the child runlet such that the variables are read-write variables for the parent runlet and read-only variables for the child runlet.

4. The method of claim 1, wherein the variables of the parent runlet are mapped into the abstract parameters of the child runlet such that the variables are read-only variables of the parent runlet and read-write variables of the child runlet.

5. The method of claim 1, wherein the variables of the parent runlet are mapped into the abstract parameters of the child runlet such that the variables are read-write variables for both the parent and the child runlets.

6. The method of claim 1, wherein the runlet function comprises a scripts.

7. A method for executing a function in a computing system, comprising:
    defining a function to be performed by a first executable unit comprising a child runlet, said function including at least one input argument;
    defining abstract parameters for the child runlet corresponding to said at least one input argument;
    mapping application parameters for an application into corresponding abstract parameters of the child runlet, said abstract parameters corresponding to said at least one input argument; and
    binding the abstract parameters of the child runlet to the application parameters of the application such that the function will employ the application parameters as function arguments if invoked during an application run-time operation, without the application proactively passing the real variables as function arguments to the function, wherein the abstract parameters of the child runlet are bound to corresponding application parameters by performing the operations of:
    declaring abstract parameters for a runlet;
    defining a hierarchical relationship between the runlet and the application such that the runlet becomes a child runlet of the application; and
    selecting application parameters of the application to be mapped into corresponding abstract parameters of the child runlet.

8. The method of claim 7, wherein the application may be served by an application server, and wherein the function may be re-invoked by the application server without requiring corresponding logic to be defined in the application.

9. An execution environment in a computing system, comprising:
    a first layer comprising a plurality of executable units called runlets, each runlet including:
    at least one function having zero or more arguments;
    declared parameters corresponding to the arguments of that runlet's at least one function; and
    declared variables that may be accessed during operations of that runlet's at least one function, wherein each runlet executes in an execution context comprising an instance of real variables and parameters corresponding to the declared variables and parameters for that runlet, and wherein parameters of a child runlet may be bound to variables of a parent runlet such that execution of a function corresponding to the child runlet employs the variables of the parent runlet as function arguments, without the function arguments being passed from the parent runlet to the child runlet, wherein the parent and child runlets comprise a portion of an application being served by an application server, and wherein a function of a child runlet may be automatically re-invoked by the application server without repairing corresponding logic to be defined in the application.

10. The execution environment of claim 9, wherein abstract parameters of a child runlet may be bound to corresponding variables of a parent runlet such that the variables are read-write variables for the parent runlet and read-only variables for the child runlet.

11. The execution environment of claim 9, wherein abstract parameters of a child runlet may be bound to corresponding variables of a parent runlet such that the variables are read-only variables of the parent runlet and read-write variables of the child runlet.

12. The execution environment of claim 9, wherein abstract parameters of a child runlet may be bound to corresponding variables of a parent runlet such that the variables are read-write variables for both the parent and the child runlets.

* * * * *